Patented Jan. 14, 1947

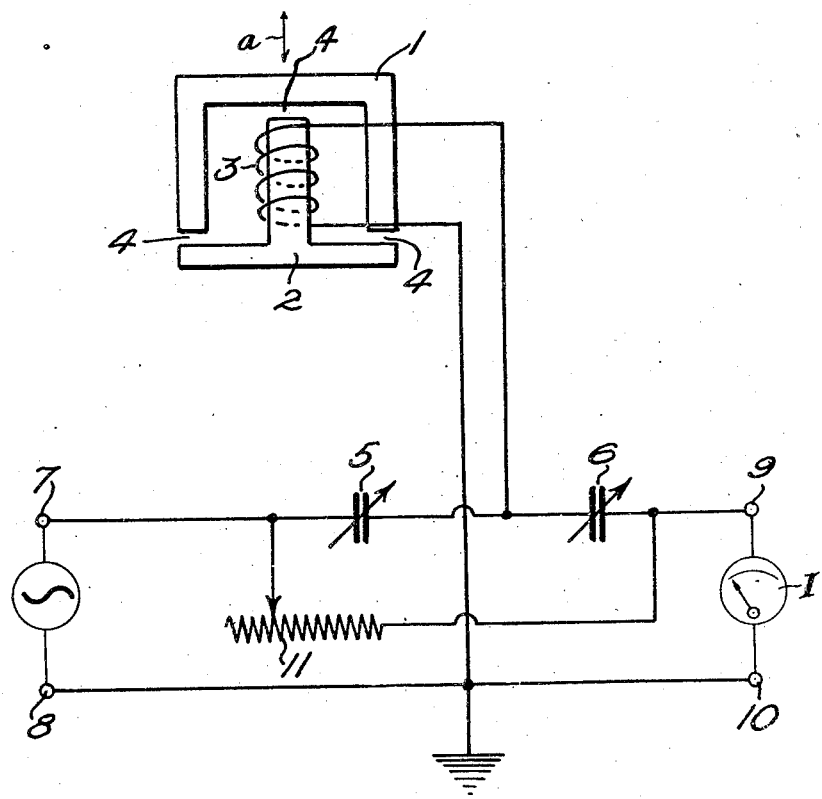

2,414,224

UNITED STATES PATENT OFFICE 2,414,224

ELECTRICAL MEASUREMENT OF DISPLACEMENT

Alan Douglas, Burnham Green, England

Application June 19, 1944, Serial No. 541,022
In Great Britain June 3, 1943

4 Claims. (Cl. 177—351)

This invention relates to the measuring and indicating of small displacements, particularly, but not exclusively, for the purpose of measuring and indicating mechanical forces causing such displacements.

Many methods have been proposed for measuring and indicating displacements by electrical means. In some such methods the arrangement has been such that the displacement causes the variation of a gap in a magnetic circuit constituting the flux path through an inductance, and thereby causes variation in said inductance, which variation in turn causes a corresponding variation in an electrical quantity and thereby actuates a measuring device. In most arrangements of this character two of such magnetic circuits and inductances have been employed which normally balance one another, thereby giving a zero reading on the measuring device, and when the gap in one of said magnetic circuits is varied the balance is distributed and the measuring device gives a reading which is a function of the gap variation.

The present invention has for its object the provision of an improved measuring and indicating device of the above character, in which, among other advantages, only one inductance will be required. Further objects of the invention are the provision of a device which will be highly sensitive and will give great rapidity of response without distortion, also substantial linearity between the displacement to be measured and the electrical variation applied to the measuring device.

The invention consists broadly of apparatus for measuring small displacements wherein an air gap, in a magnetic circuit forming the core of a coil, is physically varied in accordance with the displacement to be measured, and said coil is connected, in common, both across a source of constant frequency alternating current supply, in series with a capacity, and across an indicating instrument in series with another capacity, the arrangement being such that said instrument responds in accordance with variations in said air gap and therefore in accordance with the displacements to be varied.

The circuit across said source of alternating current supply, and including said coil and the first-named capacity, and also the circuit across the indicating instrument, and including said coil and the second named capacity, are both tuned, when the air gap is normal, to resonate at the frequency of said supply, so that no voltage is applied to the indicating instrument when said air gap is normal, and when said air gap is varied, said circuits are no longer so tuned so that a voltage is applied to said indicating instrument.

It will be seen that the magnetic circuit is relieved of all stress and the speed of response is limited only by the inertia of the component parts.

If the percentage change in the variation of the air gap is kept small, even for the maximum displacement to be measured, to say 1% of the initial air gap, then a substantially linear relationship obtains between the change in gap and the change in inductance of the coil.

In order to ensure operational stability, one procedure would be, not to earth the frequency generating source, and to employ a balanced and screened transformer to connect the frequency generator to the circuit. In practical applications, however, a high degree of stability may be achieved if a common earth connection is used for the frequency source, the coil and the device which detects the electrical variation in the coil circuit, and in order that the invention may be more clearly understood an embodiment thereof involving this last named arrangement will now be described with reference to the accompanying diagrammatic drawing.

Referring to this drawing the displacement which is to be measured is physically transmitted to a U-shaped piece of iron 1 which is correlated with a T-shaped piece of iron 2 having a coil 3 wound on its centre member, in such a way that, as shown, a magnetic circuit for the flux of said coil is constituted having three equal air gaps 4, two between the respective extremities of the piece 1 and the cross member of the piece 2, and one between the crutch member of the piece 1 and the extremity of the centre member of the piece 2. The displacement of the piece 1 is indicated graphically in the drawing by the double-ended arrow $a$, and this displacement is in such a direction as to simultaneously reduce or simultaneously increase all these air gaps 4.

Two equal variable condensers 5 and 6 (which may be mechanically coupled together) are provided having a plate of the one connected to a plate of the other. One end of the coil 3 is connected to the junction point of these two plates and the other end of said coil is connected to earth. A source of constant frequency oscillations has one of its terminals 7 connected to the other plate of the condenser 5 and its other terminal 8 connected to earth. A detector device or measuring instrument I has one of its terminals 9 connected to the other plate of the condenser 6, and its other terminal 10 connected to earth. A variable resistance 11 is connected across the two condensers as shown for balancing the resistance of the coil.

When the air gap 4 is normal the circuit 7, 5, 3, 8 is tuned to resonate at the frequency of the source and the circuit of 9, 6, 3, 10 is also tuned to resonate at that frequency, and thus no voltage appears across the terminals 9, 10. If the air gap 4 is varied the inductance of the coil 3 is varied and the said two circuits no longer resonate at the frequency of the source and a voltage is applied to the terminals 9, 10 of the indicating instrument. This voltage is a function of the gap variation and therefore of the displacement of the piece 1 and of the applied force.

What I claim and desire to secure by Letters Patent is:

1. Apparatus for measuring small displacements comprising a pair of magnetic material elements forming a magnetic circuit having an air gap, one of said elements being movable to vary the air gap in accordance with the displacement to be measured, a coil on one of said magnetic elements, a pair of input circuit terminals across which a source of constant frequency alternating current may be connected, a condenser, said condenser and coil being connected in series across said terminals, and a measuring circuit including an indicating instrument and a second condenser connected in series across said coil.

2. Apparatus as recited in claim 1, wherein said condensers are adjustable and tuned at a preselected normal length of air gap to resonate the input circuit and the measuring circuit at the frequency of said alternating current source; whereby no voltage is applied to the indicating instrument when the air gap is of normal length, and a voltage is applied upon detuning of said circuits by change in the air gap length.

3. Apparatus as recited in claim 1, in combination with a resistance connected across said condensers for balancing the resistance of said coil.

4. Apparatus as recited in claim 1, wherein one input circuit terminal is earthed, and said coil and said indicating instrument each have a terminal directly connected to said earthed input circuit terminal.

ALAN DOUGLAS.